United States Patent
Polle et al.

[11] Patent Number: 5,794,891
[45] Date of Patent: Aug. 18, 1998

[54] METHOD OF CONTROLLING THE ATTITUDE CONTROL FOR SATELLITES ON AN ORBIT INCLINED RELATIVE TO THE EQUATOR

[75] Inventors: Bernard Polle, Saint-Orens; Marcel Billand, route de Clozolles; Benoît Hanin, Saint Foy D'Aigrefeuille, all of France

[73] Assignee: Matra Marconi Space France, Paris, France

[21] Appl. No.: 582,441

[22] Filed: Jan. 3, 1996

[30] Foreign Application Priority Data

Jan. 6, 1995 [FR] France ................... 95 00126

[51] Int. Cl.$^6$ ............................................. B64G 1/24
[52] U.S. Cl. .................................... 244/164; 244/168
[58] Field of Search .......................... 244/163, 164, 244/158 R, 168

[56] References Cited

U.S. PATENT DOCUMENTS 3,603,530  9/1971  Easton et al. .................. 244/1
5,618,012  4/1997  Lehner et al. ................ 244/168

FOREIGN PATENT DOCUMENTS 9221562  12/1992  WIPO .

OTHER PUBLICATIONS

Proceedings of the 28th Eintersociety Energy Conversion Engineering Conference, vol. 1, Aug. 8, 1993–Aug. 13, 1993, Atlanta, U.S.A. pp. 1428–1444, XP 000428328 Seaworth et al. "Implications of A Solar Electric Orbital Transfer Vehicle Design on Power System Requirements" p.1430, right column, line 1—p. 1432, left column, line 18—p. 1438, left column, line 1—p. 1441, right column, line17; Figs. 14–21.

Primary Examiner—Galen L. Barefoot
Attorney, Agent, or Firm—Larson & Taylor

[57] ABSTRACT

The attitude of a satellite placed on a non-heliosynchronous earth orbit in a plane that is inclined relative to the equatorial plane of the earth is controlled for efficient use of solar panels and radiators. The satellite has a structure, solar panels apt to be rotated with respect to the structure rotation and two opposed radiators each fixed on one of two opposed faces of the satellite structure which are orthogonal to the rotation axis. One of the radiators has greater emissivity than the other. A yaw axis bound to the structure satellite and orthogonal to rotation axis is aimed towards the earth. The solar panels of the satellite are maintained in an optimum orientation relative to the sun by rotating them. At least during periods of each year when an angle $\beta$ between a sun-earth direction and the plane of the satellite orbit lies between two predetermined values, the satellite structure is rotated about the yaw axis to maintain the radiators in a plane parallel to a direction toward the sun so long as the satellite is remote from an orthogonal projection of the sun direction onto the satellite orbit plane. The orientation of the satellite structure is reversed when necessary to ensure that the radiator of higher emissivity is in shadow.

10 Claims, 3 Drawing Sheets

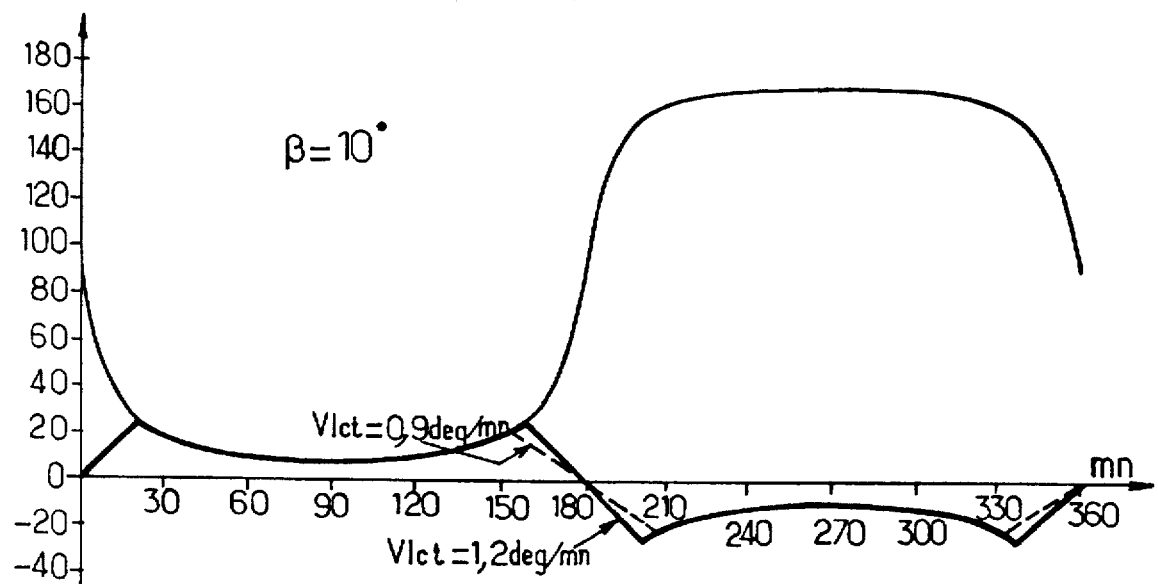
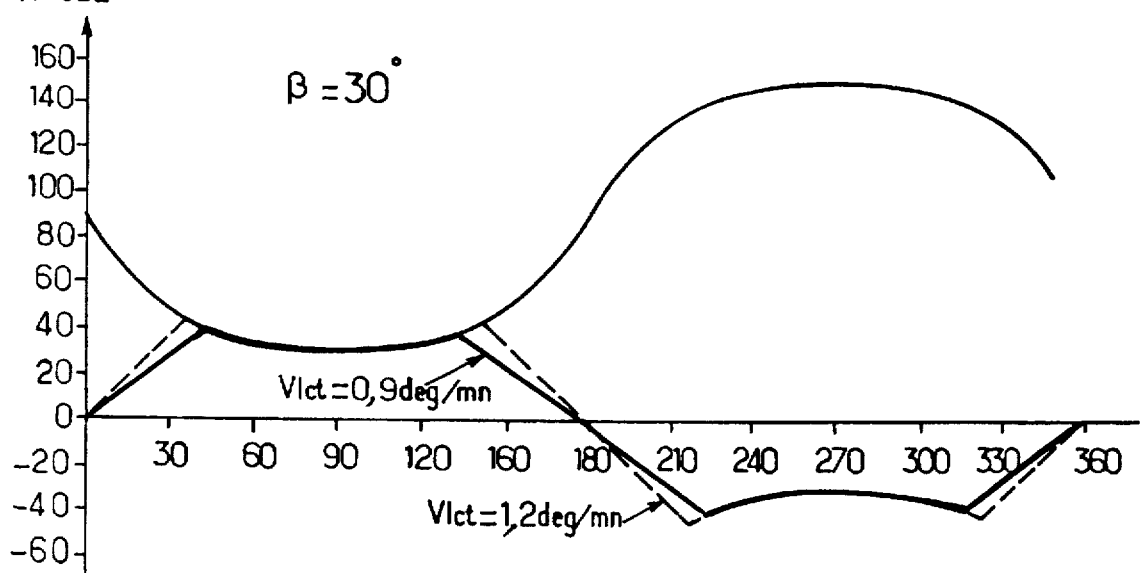

METHOD OF CONTROLLING THE ATTITUDE CONTROL FOR SATELLITES ON AN ORBIT INCLINED RELATIVE TO THE EQUATOR

BACKGROUND OF THE INVENTION

The invention relates to methods of operating a satellite whose angular position is controlled about three mutually orthogonal axes and which is placed on an orbit whose plane is inclined relative to the plane of the equator of the earth.

The invention is of interest whenever the satellite is placed on an orbit that is not heliosynchronous. In particular, it is applicable to:

satellites placed on "intermediate" orbits that are generally circular and at an altitude higher than the Van Allen belts, between 8000 km and the altitude of the geostationary orbit (e.g. satellites such as NAVSTAR and INMARSAT P21);

satellites of the Molniya type which are placed on an elliptical orbit having an inclination of about 60°, with an apogee at about 30,000 km and a perigee beneath the Van Allen belts; and earth observation satellites in low orbit.

Satellites carrying an active payload are provided with solar cells constituted by panels apt to be moved angularly relative to the structure of the satellite about an axis Y.

They are also provided with radiators for cooling by radiating into dark space, which radiators are placed on at least one of the faces, referred to as +Y and as −Y, that are perpendicular to the Y axis.

FIG. 1 shows such a satellite comprising a structure 14 on which solar panels 16 can be rotated about an axis so that they face the sun 18. Radiators 22 are placed on the faces of the structure that are orthogonal to the Y axis for the purpose of dumping heat. The radiators are constituted by rectangular plates that may form part of the structure or that may be separate therefrom, in which case they are connected by heat conducting means such as heat pipes to the members which are to be cooled.

The capacity of a radiator 22 for dumping heat is related to the solar flux it absorbs when exposed to the sun. Conventionally, attempts are made to keep the angle at which the sun "sees" the exposed radiator to a value that is as small as possible, so as to reduce the absorbed flux.

In contrast, it is desired to keep the solar cells 16 orthogonal to the flux from the sun. Finally, considerations associated with operating the payload generally require that a Z axis (bound to the satellite and orthogonal to the Y axis) be kept aimed towards the Earth, so as to constitute a yaw axis for the satellite.

For a satellite placed on a geostationary equatorial orbit 10, the method conventionally used for achieving a compromise between the above requirements consists in maintaining the Y axis orthogonal to the plane of the orbit so that it constitutes a pitch axis, and to keep the solar cells optimally oriented about the pitch axis by rotating them about the Y axis; the third axis (X axis) then constitutes a roll axis.

For a satellite placed on an inclined orbit that is not heliosynchronous, at an inclination angle i relative to the equator plane, the angle $\beta$ between the direction to the sun and the plane of the satellite orbit varies between 0° and i+23.45° over a year. For small values of the angle $\beta$, typically up to 8°, it is possible to continue pointing the satellite in the same way as for a geostationary satellite.

Beyond that value, solar cell performance drops off and one of the radiators receives significant solar flux. That is why, at present, use is generally made of a so-called "sun-nadir" mode of pointing (SNP). The X axis of the satellite is maintained in the plane containing both the direction to the sun and the yaw axis (Z axis) of the satellite. This is always possible by appropriately adjusting the angular position of the satellite about its yaw axis (Z axis). The axis of rotation Y of the solar panels is always perpendicular to the direction of the sun and the solar cells are oriented perpendicularly to the direction of the sun 18 by rotating the panels about the Y axis, using a mechanism for steering the panels. When pointed in this way, the faces +Y and −Y of the satellite which are used as heat radiators never "see" the sun.

Variations in the yaw angle over the duration of an orbit are shown in solid lines in FIGS. 3 and 4 for a 6-hour circular orbit, with $\beta=10°$ and with $\beta=30°$.

This mode of pointing provides maximum efficiency for the solar cells and the radiators. However, when the angle $\beta$ between the direction of the sun and the plane of the satellite orbit is small, the satellite should be rotated at high speed about its yaw axis Z. If the orbital angular frequency is $w_0$, then the yaw speed required reaches a value equal to $w_0/\tan\beta$ at points A and B on a circular orbit (FIG. 2).

Unfortunately, the yaw speed may be limited by the capacity of the satellite attitude control system. In addition, high yaw speed can present drawbacks for the satellite mission (e.g. for a satellite using multibeam antennas).

To reduce these drawbacks, it is possible to replace the ideal "sun-nadir" pointing law with a composite law:

for small values of angle $\beta$, a pointing law of the above-mentioned geostationary type is adopted; then the case yaw speed is zero, the efficiency of the solar cells varies as a function of $\cos\beta$, and the solar flux absorbed by one or other of the radiators is proportional to $\sin\beta$ alternately on the +Y face and on the −Y face;

for large values of the angle $\beta$, the ideal "solar-nadir" pointing law is used, as shown in fine lines in FIGS. 2 and 3; and in the vicinity of points A and B, rotation takes place at a constant maximum speed, as shown by the straight lines in FIGS. 2 and 3: the maximum yaw speed $V_{yaw}$ is adopted before and after it is necessary for following the ideal relationship, so as to compensate for the time intervals where it is insufficient for following the ideal relationship.

Chain-dotted lines represent a situation where the maximum yaw speed is 1.2°/min., and dashed lines represented a maximum yaw speed of 0.9°/min., in which case it is no longer possible to follow the ideal relationship at any time for $\beta \leq 10°$.

During the time when the ideal law is not followed, firstly the +Y and −Y radiators receive solar flux alternately and transiently, and secondly the power available from the solar cells is slightly diminished.

For large values of angle $\beta$, the sun-nadir relationship as modified above coincides with the ideal sun-nadir relationship, as can be seen by comparing FIGS. 2 and 3. For $\beta=45°$ it is possible to retain the ideal sun-nadir relationship even for $V_{yaw}=0.9°/min$. without altering orbit parameters.

The successive attitudes of the satellite in the portion of its orbit close to point B are shown diagrammatically in FIG. 5 where the solar cells are referenced 16a and 16b in order to distinguish them.

SUMMARY OF THE INVENTION

An object of the present invention is to provide a method making it possible to improve the efficiency of the radiators, and to do so by with means that are simple.

To this end, there is provided, in particular, a method of controlling the attitude of a satellite placed on non-heliosynchronous earth orbit in a plane that is inclined relative to the equatorial plane of the earth, comprising: maintaining a yaw axis Z bound to the satellite aimed towards the earth and maintaining solar panels of the satellite in an optimum orientation relative to the sun by rotating them about an axis Y of the panels which is orthogonal to the yaw axis, and locating radiators on two faces of the satellite orthogonal to the axis Y, one of the radiators having greater emissivity than the other; and at least during periods of the year when an angle β between the sun-earth direction and the plane of the satellite orbit lies between two predetermined values, rotating the satellite about the yaw axis so as to maintain the radiators in a plane substantially parallel to the sun direction so long as the satellite is remote from the orthogonal projection (ab) of the sun direction onto the satellite orbit plane, and the satellite is brought into an orientation symmetrical to that which it had previously relative to the plane containing said projection (ab) and the sun direction by being rotated about its yaw axis Z at a predetermined reference speed in such a manner as to ensure that it is always the radiator of higher emissivity that is in shadow.

In addition, the satellite is turned over through 180° about its yaw axis when the angle β passes through the value 0, so that it is always the same radiator which is permanently in shadow. For a circular orbit such turning over takes place about once every 6 months.

In periods of the year when the angle β is greater than the second predetermined value, the orientation of the satellite is advantageously controlled in accordance with a sun-nadir law which is modified so long as the angle β is so small that complying with the ideal sun-nadir relationship would imply yaw speeds greater than the maximum acceptable value.

The second predetermined value is advantageously that for which the mean efficiency of the solar cells and/or the mean efficiency with which heat is dumped by the radiators during one orbit is the same for the modified sun-nadir law and for the attitude control law in which the satellite is moved into a symmetrical position.

In a first embodiment, the attitude law in which the satellite is moved into a symmetrical position is used starting from a value $\beta_1=0$. In another embodiment, this attitude law is not used until a value $\beta_1$ is reached that is selected in application of a determined criterion. One possible criterion is to adopt a value $\beta_1$ such that there is no eclipse for values of β greater than the determined value.

Further features of the invention will appear more clearly from the following description of a particular embodiment, given by way of example, and of modifications thereof. The description refers to the accompanying drawings.

BRIEF DESCRIPTION OF THE DRAWINGS

FIGS. 7 and 8 are similar to FIGS. 4 and 5 and show the variation in the yaw angle when implementing the method of the invention respectively for β=10° and for β=30°.

DETAILED DESCRIPTION OF PREFERRED EMBODIMENTS

Figure 1:
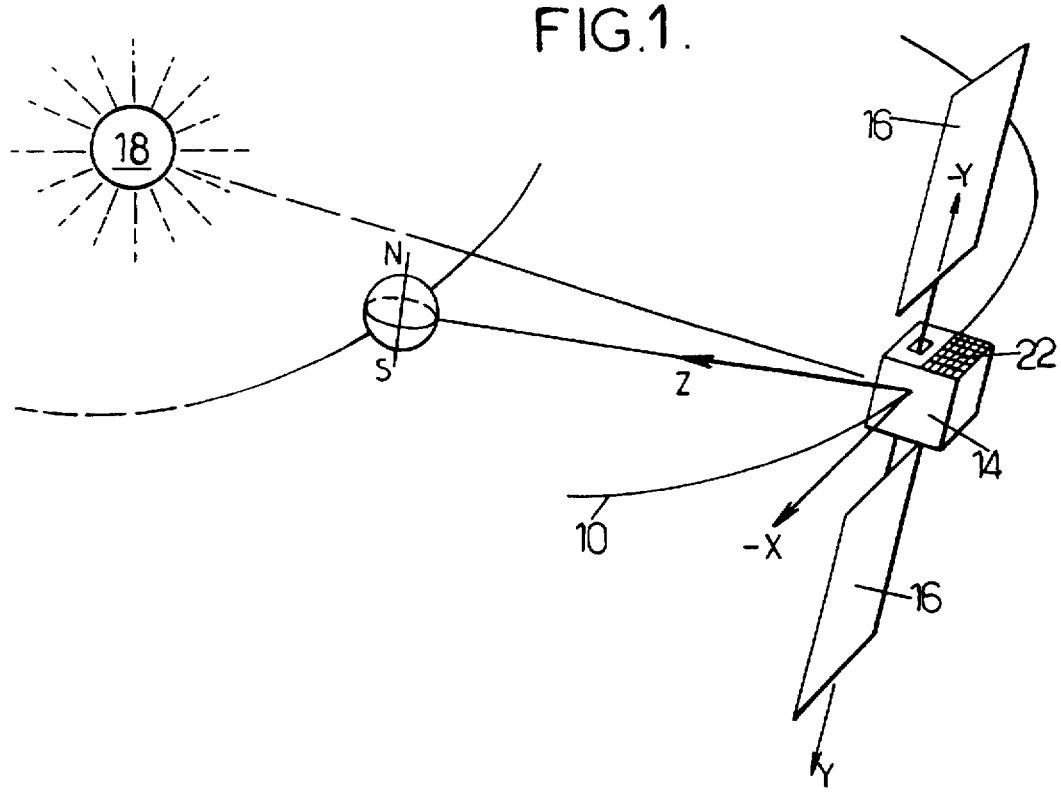
FIG. 1 is a theoretical diagram showing the main features of a stabilized satellite whose orientation about three axes X, Y, and Z can be controlled.
Figure 2:
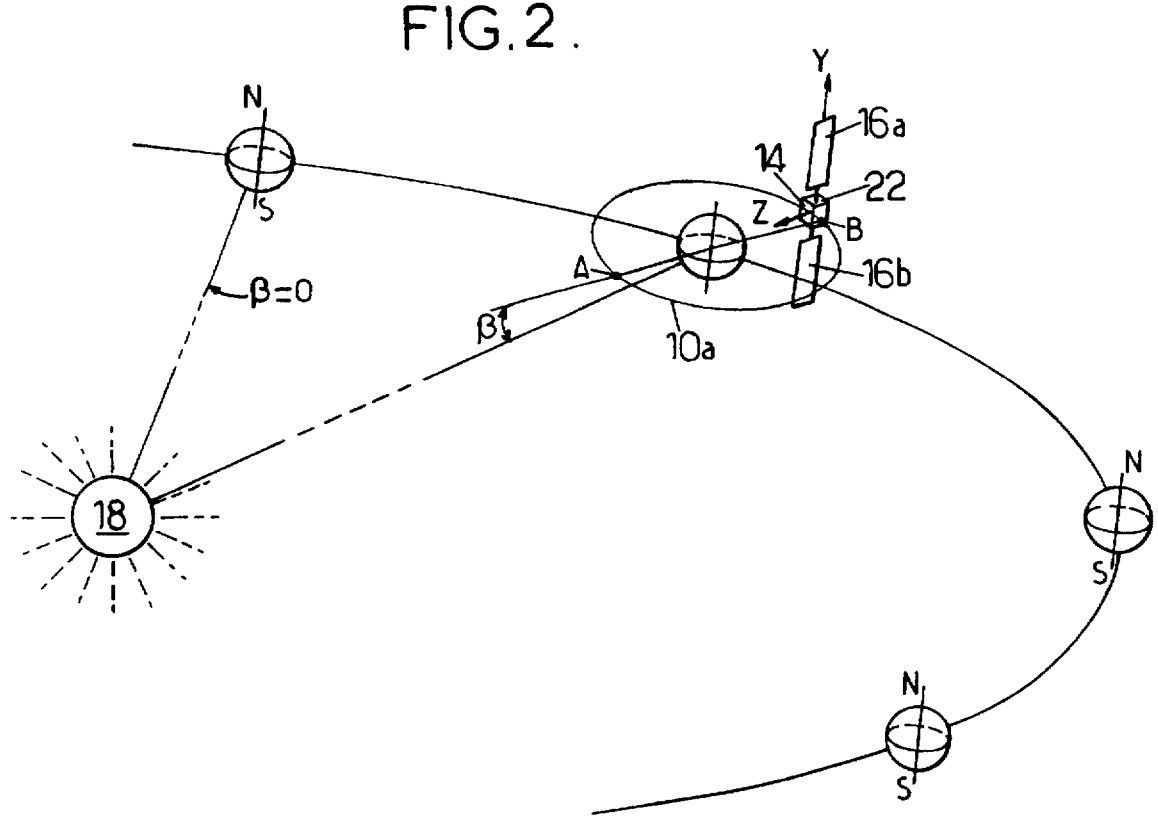
FIG. 2 is similar to FIG. 1 and shows parameters that are relevant when choosing how to control the attitude of a satellite placed on an inclined orbit that is not heliosynchronous.

The method is described as implemented on a satellite of the kind shown in FIG. 2. One of the radiators 22 carried on one of its faces +Y and −Y which will be continuously in shadow, is given higher emissivity than the other radiator.

This result is generally obtained by different surface treatments, e.g. by a coating of white paint on the radiator having a higher emissivity. If structural constraints make it necessary for one of the radiators to have a larger area than the other, then it is the larger area radiator 22 that will be kept permanently in shadow.

By way of example, the following characteristics may be used for a satellite having radiators of the same area.

Radiator 22b (kept in shadow): emissive coating, having an emission coefficient in the infrared $\epsilon=0.88$ at the beginning of its life.

Radiator 22a: $\epsilon=0.81$.

Twice a year, whenever the angle of incidence β of the sun's rays relative to the plane of the orbit passes through zero, the satellite is turned over through 180° about its yaw axis Z. This maneuver can be performed by using satellite control means such as momentum wheels and/or wheel "desaturation" thrusters, and the maneuver can be spread out over time so as to avoid excessive acceleration.

This maneuver is required about twice a year for a satellite placed on an intermediate circular orbit.

The relationship with which attitude is controlled as a function of time over one orbit period then depends on the angle β. It is therefore not the same throughout the year.

1. For very small angles β, less than a value $\beta_1$ it is possible, and often advantageous, to use the same law of aiming as for a satellite in geostationary orbit: the axis Y of the satellite is maintained perpendicular to the plane of the satellite orbit. Because the satellite is periodically turned over, the face +Y of the satellite is always in shadow whereas the face −Y of the satellite sees the sun at an angle of incidence β. For values of the angle of incidence β lying in the range 0 to $\beta_1$, the yaw speed is therefore zero.

Figures 5, 6:
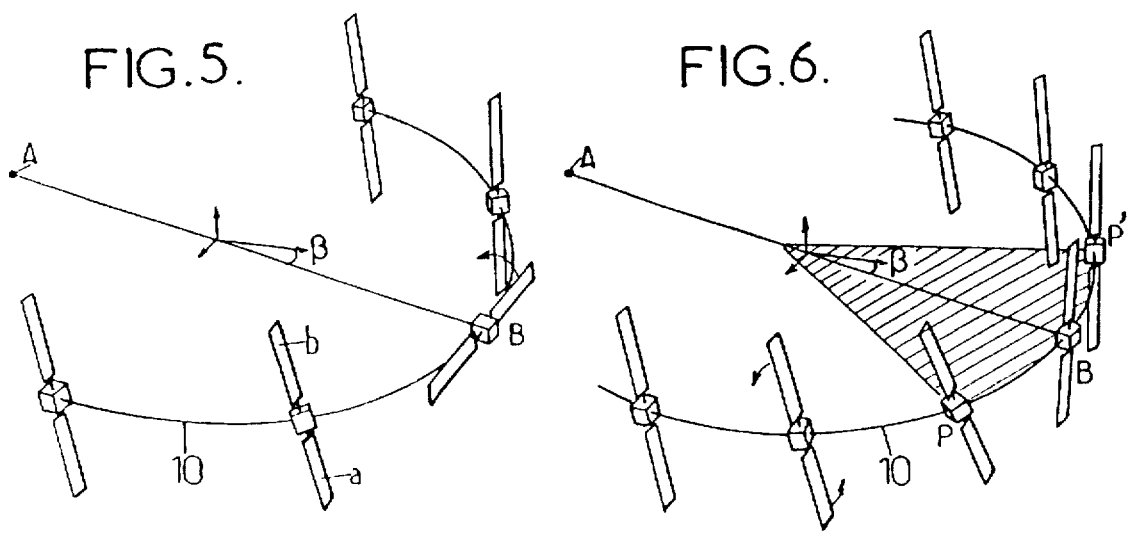
FIGS. 5 and 6 are diagrams for showing how the attitude of the satellite varies, respectively when using the sun-nadir orientation law and an orientation law of the invention.

2. For values of β lying in a range $\beta_1$ (which may be zero) and some other value, $\beta_2$, a composite relationship is used that may be referred to as a "rendezvous" or a "homing" relationship. The axis Z is kept pointing towards the center of the earth. The yaw angle is controlled so that:

for portions of the orbit of the satellite that are remote from points A and B, orientation about the axis Z is controlled according to the sun-nadir law; and for portions close to the points A and B, i.e. on the arc marked PP' in FIG. 6, the satellite is brought into a symmetrical position by reversing the direction of rotation in yaw. This operation is performed at the maximum accepted yaw speed and the length of the arc PP' consequently depends on said maximum speed.

3. Beyond $\beta_2$, it is generally possible to maintain the sun-nadir relationship on the orbit, but the modified sun-nadir relationship may be adopted if the acceptable maximum speed is too small. The modified relationship is theoretically less favorable from the point of view of efficiency; the loss of efficiency is negligible for an appropriate choice of $\beta_2$ because the angle of incidence of the sun on the faces Y is practically glancing.

Optimum values for $\beta_1$ and $\beta_2$ are to be selected. In general, it is possible to use the following criterion:

the angle $\beta_1$ as defined above; and the angle $\beta_2$ is the angle for which the rejection capacities are the same, over the duration of one orbit for the "rendezvous" law of variation and for the possibly modified "sun-nadir" law.

Figure 3:
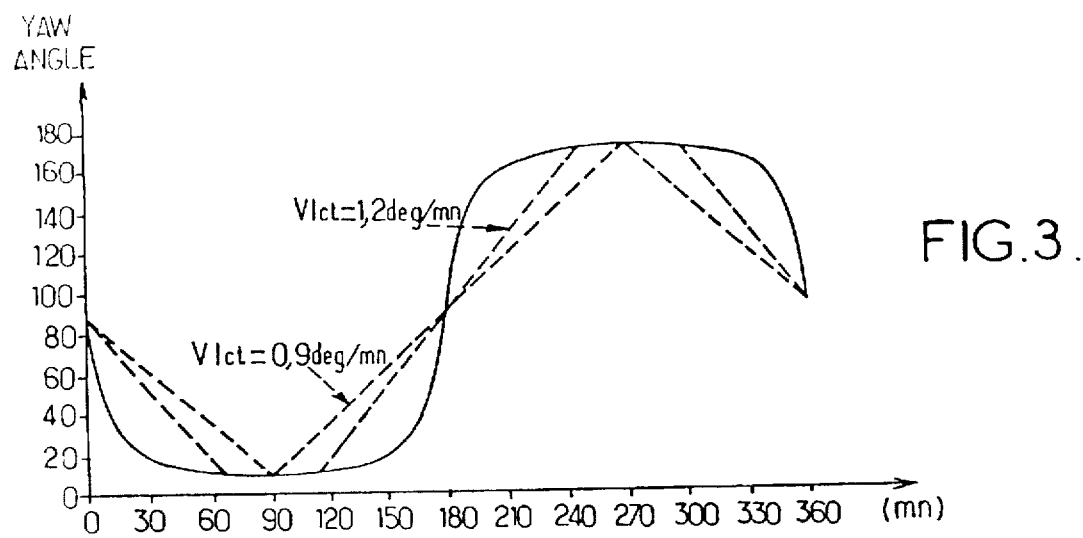
FIGS. 3 and 4 are graphs showing variation in the yaw angle as a function of time when using the "sun-nadir relationship", respectively for an angle b of 10° and for an angle β of 30°.
Figure 4:
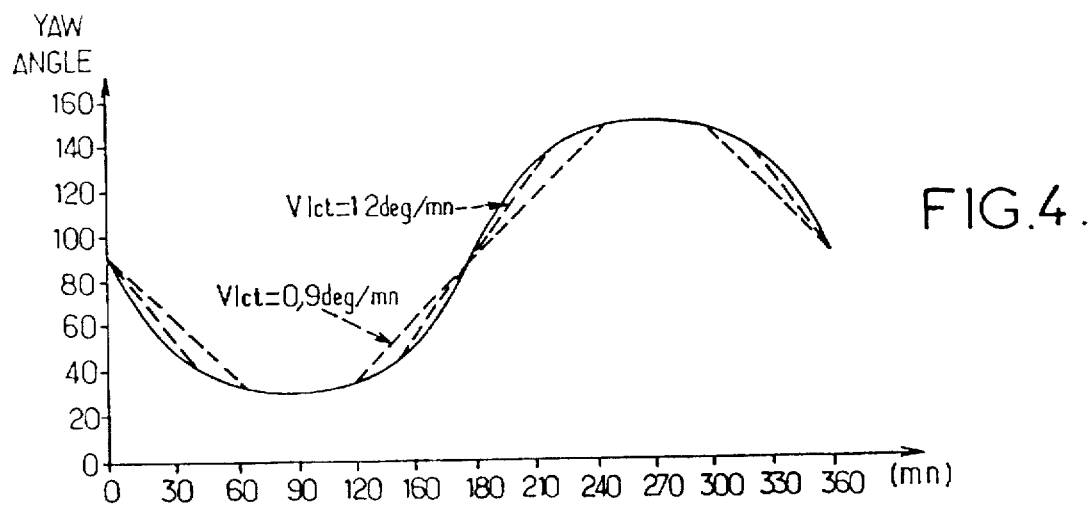

By way of example, FIGS. 7 and 8 use heavy lines to show how the yaw angle is varied when $\beta$ is equal to 10° or 30°. There is coincidence with the sun-nadir law for the portions of the orbit other than PP' in FIG. 6, and a symmetrical portion with respect to point A. Like the curves in FIGS. 3 and 4, the curves in FIGS. 7 and 8 correspond to a circular orbit having an inclination of 45°, and a period of 6 hours. To simplify control, the "rendezvous" law is adopted as soon as $\beta=0°$ and up to an angle $\beta_2$ of about 35°.

This choice is a result of the characteristics given to the radiators:

the radiator on the face −Y (which is exposed) to the sun only transiently is treated to have a rejection capacity of 291 W/m² at 40° C.; and the radiator on face +Y which is never exposed is painted white, thereby giving it a thermal rejection capacity of 458 W/m².

Consequently, the mean rejection rate is 374 W/m², which is to be compared with the value of about 347 W/m² that would otherwise be obtained using the traditional sun-nadir relationship.

The heat dumping capacity is thus the same for the "rendezvous" relationship and for the modified sun-nadir relationship at about $\beta=35°$. Below that value the "rendezvous" relationship is used with homing durations (sloping straight lines in FIGS. 7 and 8) that depend on the maximum acceptable yaw speed.

At the values of $\beta$ for which the "rendezvous" relationship is used, the improvement in heat dumping capacity via the radiators is not accompanied by significant loss of efficiency in the solar generators, as can be seen from the table below where the value 1 corresponds to the sun being permanently at an angle of incidence of 90° to the solar generators.

| | Mean solar generator efficiency over one orbit | | | |
|---|---|---|---|---|
| Pointing law | Maximum yaw speed °/mn | $\beta = 10°$ | $\beta = 20°$ | $\beta = 30°$ |
| Modified sun-nadir | 0.9 | 0.955 | 0.982 | 0.995 |
| Modified sun-nadir | 1.2 | 0.982 | 0.995 | 0.9995 |
| Rendez-vous | 0.9 | 0.998 | 0.988 | 0.966 |
| Rendez-vous | 1.2 | 0.998 | 0.989 | 0.972 |

In a modified embodiment of the invention, a geostationary type pointing relationship is adopted instead of a "rendezvous" type relationship up to an angle $\beta_1$ that is not equal to 0. This angle may be as defined above. With the dumping capacity and the orbital characteristic specified above, $\beta_1$ is about 22.5°.

This modification has the advantage of making it possible to control yaw without using an internal gyroscopic reference. For values of $\beta>22.5°$, the direction of the sun and the direction of the earth are well separated regardless of the position of the satellite on its orbit. It is then possible to use the sun as a reference while performing yaw maneuvers. This does not require a greater complexity of the satellite since a satellite is generally already provided with earth-horizon and sun sensors.

When the value of $\beta$ is less than 22.5°, i.e. during periods of the year where there is a risk of the satellite passing into the shadow of the earth, geostationary type pointing does not require any yaw rotation. The maximum value of yaw drift can be deduced from a knowledge of the on-board momentum and by estimating disturbing torque, as for a geostationary satellite.

We claim:

1. A method of controlling the attitude of a satellite placed on a non-heliosynchronous earth orbit in a plane that is inclined relative to the equatorial plane of the earth, said satellite having a structure, solar panels apt to be rotated with respect to said structure about an axis of rotation and having two radiators each fixed on one of two opposed faces of the satellite structure which are orthogonal to the rotation axis, one of the radiators having greater emissivity than the other, comprising the steps of:

maintaining a yaw axis Z bound to the structure of the satellite and orthogonal to said rotation axis aimed towards the earth;

maintaining solar panels of the satellite in an optimum orientation relative to the sun by rotating them about said rotation axis Y; and at least during periods of each year when an angle $\beta$ between a sun-earth direction and the plane of the satellite orbit lies between two predetermined values, rotating the satellite structure about the yaw axis so as to maintain the radiators in a plane substantially parallel to a direction toward the sun so long as the satellite is remote from an orthogonal projection of the sun direction onto the satellite orbit plane, and bringing the satellite structure into an orientation symmetrical to that which it had previously relative to the plane containing said projection and the sun direction by rotating said structure about the yaw axis Z at a predetermined reference speed in such a manner as to ensure that the radiator of higher emissivity is in shadow.

2. Method according to claim 1, wherein the satellite structure is turned over through 180° about its yaw axis when the angle $\beta$ crosses zero.

3. Method according to claim 2, comprising, during the periods of the year when the angle $\beta$ is greater than a greater one of said predetermined values, controlling the orientation of the satellite structure in accordance with a sun-nadir law which is modified so long as the angle $\beta$ is so small that complying with the ideal sun-nadir relationship would imply yaw speeds greater than a predetermined maximum value.

4. Method according to claim 3, wherein said greater of said second predetermined values is the value for which a mean efficiency of the solar panels during a full orbit is the same for the modified sun-nadir law and for an attitude control law which requires that the satellite structure be reversed.

5. Method according to claim 3, wherein said greater of said predetermined values is the value for which a mean efficiency with which heat is dumped by the radiators during one orbit is the same for the modified sun-nadir law and for the attitude control law requiring that the satellite structure be reversed.

6. Method according to claim 1, wherein the satellite structure is moved angularly into a symmetrical position starting from a smaller of said predetermined values which is zero.

7. Method according to claim 7, wherein the satellite structure is moved angularly into a symmetrical position starting from a smaller of said predetermined values which is greater than zero.

8. Method according to claim 7, wherein said smaller value is selected so that there is no eclipse for values of angle $\beta$ greater than the predetermined value.

9. Method according to claim 1, comprising measuring an angular position of the sun from the satellite structure as a reference for controlling the attitude of the satellite structure about the yaw axis.

10. Method according to claim 1, comprising providing a coating of white paint on the radiator maintained in shadow.

* * * * *